United States Patent [19]
Schleusener et al.

[11] Patent Number: 5,767,888
[45] Date of Patent: Jun. 16, 1998

[54] PROCESS AND ARRANGEMENT FOR GENERATING HIGH-QUALITY MATRIX PRINT USING ELECTROPHOTOGRAPHIC PRINTING EQUIPMENT

[75] Inventors: Martin Schleusener, Zorneding; Volkhard Maess, Altenerding; Edward Morris, Erding, all of Germany

[73] Assignee: Oce Printing Systems GmbH, Poing, Germany

[21] Appl. No.: 495,489

[22] PCT Filed: Feb. 4, 1994

[86] PCT No.: PCT/EP94/00323

§ 371 Date: Aug. 10, 1995

§ 102(e) Date: Aug. 10, 1995

[87] PCT Pub. No.: WO94/18786

PCT Pub. Date: Aug. 18, 1994

[30] Foreign Application Priority Data

Feb. 10, 1993 [DE] Germany ............ 93 102 070.5

[51] Int. Cl.$^6$ ............ G01D 15/14; G03G 21/00; H04N 1/21
[52] U.S. Cl. ............ 347/130; 347/131; 358/298; 358/296; 358/459; 399/55; 399/56; 399/47; 399/48
[58] Field of Search ............ 347/130, 131, 347/251; 358/298, 459, 458, 296; 399/55–56, 47–48

[56] References Cited

U.S. PATENT DOCUMENTS

| | | | |
|---|---|---|---|
| 4,543,613 | 9/1985 | Sakamoto | 358/298 |
| 4,809,021 | 2/1989 | Check et al. | 347/251 |
| 4,985,779 | 1/1991 | Gall | 358/298 |
| 5,128,699 | 7/1992 | Nakajima et al. | 358/298 |
| 5,155,598 | 10/1992 | Ramekers et al. | 358/298 |
| 5,204,753 | 4/1993 | Tai | 358/298 |
| 5,258,832 | 11/1993 | Rylander | 358/459 X |
| 5,270,827 | 12/1993 | Kobayashi et al. | 358/298 |
| 5,366,835 | 11/1994 | Namiki et al. | 358/298 |
| 5,434,672 | 7/1995 | McGuire | 358/459 X |
| 5,453,773 | 9/1995 | Hattori et al. | 347/131 X |
| 5,469,267 | 11/1995 | Wang | 358/298 |
| 5,471,282 | 11/1995 | Hayashi et al. | 399/55 X |
| 5,493,410 | 2/1996 | Oikawa | 358/298 |
| 5,640,191 | 6/1997 | Zulian et al. | 347/131 X |
| 5,648,810 | 7/1997 | Tanuma et al. | 347/130 |

FOREIGN PATENT DOCUMENTS

| | | |
|---|---|---|
| 0190901 | 8/1986 | European Pat. Off. |
| 0225697 | 6/1987 | European Pat. Off. |
| 92/01353 | 1/1992 | WIPO |

Primary Examiner—Peter S. Wong
Assistant Examiner—K. Shin
Attorney, Agent, or Firm—Hill & Simpson

[57] ABSTRACT

An electrophotographic process and arrangement for generates a macro-charge zone inkable by toner applicators and delimited by an inking limit (EG) having an adjustable contour on a photoconductor of a printing or copying machine, using at least one exposure-variable and position-variable controllable light source (LED), such as an LED comb or laser. By controlling the exposure of the light source and its radiation position on the photoconductor and by controlling a bias voltage (UB) which can be applied between photoconductor and toner applicator, an electro-static potential relief (UR) made up of individual adjacent micro-charge zones (UM) of exposure-dependent size is generated on the photoconductor and the inking limit (EG) is defined, the contour of the inking limit being determined by the bias voltage level (UB) on the potential relief (UR). The process and the arrangement allow an offset-like printing quality to be obtained, both with respect to the generation of half-tone images and of lines and characters.

21 Claims, 9 Drawing Sheets

FIG 8

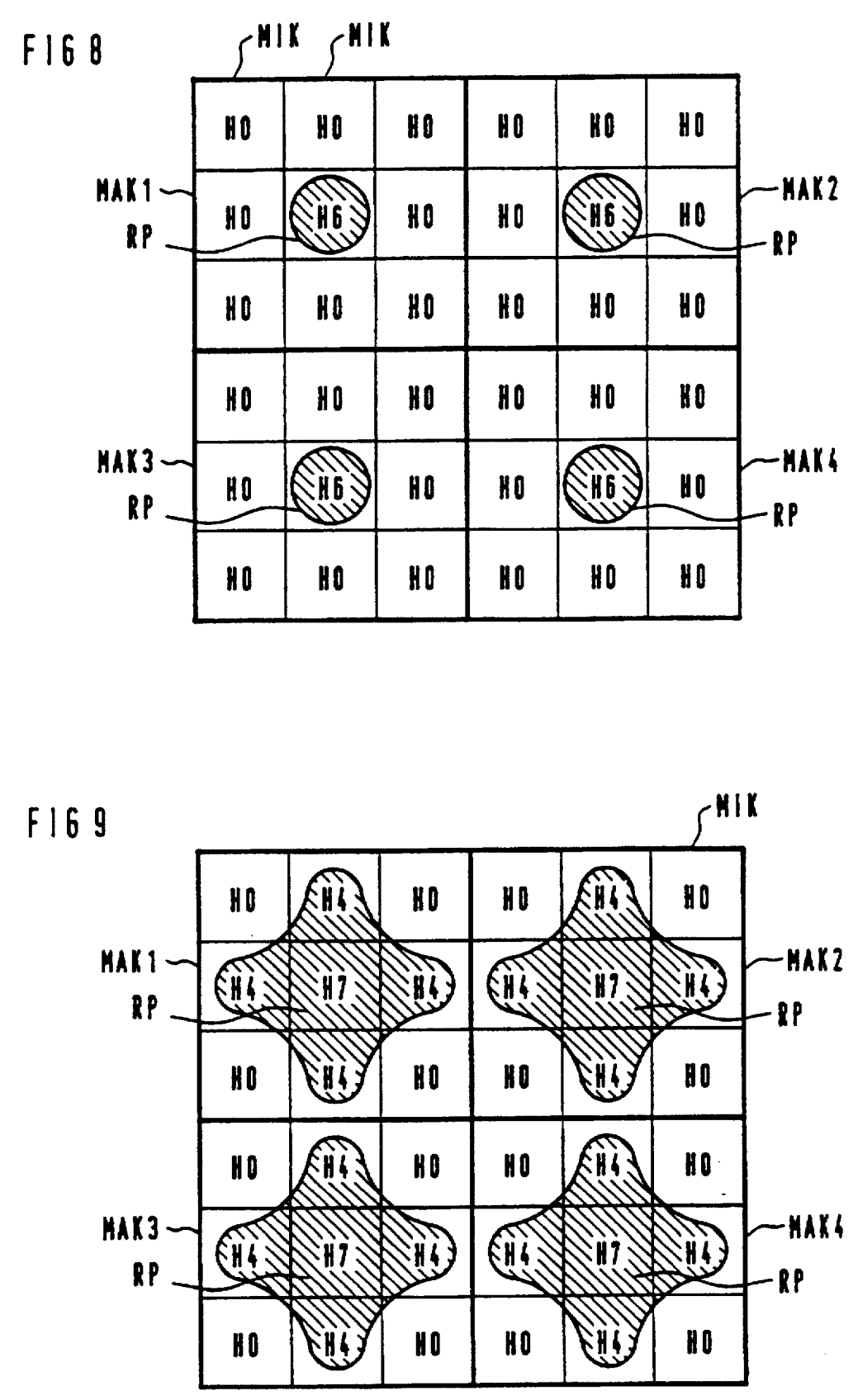

MIK, MIK

MAK1 — RP
MAK2 — RP
MAK3 — RP
MAK4 — RP (grid of H0 cells with H6 circles at four positions)

FIG 9

MIK

MAK1 — RP
MAK2 — RP
MAK3 — RP
MAK4 — RP (grid with H4 and H7 cells forming four cross-shaped patterns)

PROCESS AND ARRANGEMENT FOR GENERATING HIGH-QUALITY MATRIX PRINT USING ELECTROPHOTOGRAPHIC PRINTING EQUIPMENT

BACKGROUND OF THE INVENTION

1. Field of the Invention

Process and arrangement for generating high-quality matrix print using electrophotographic printing equipment.

2. Description of the Related Art

The invention relates to an electrophotographic process and an arrangement for generating a macro-charge zone that is inkable by toner applicators and delimited by an inking limit having an adjustable contour on a photoconductor of a printing or copying machine, using at least one exposure-variable and a position-variable controllable light source.

In electrophotographic printing equipment, it has previously been common to represent characters and half-tone images by means of point matrices which comprise individual inked points of predetermined size. Gray gradations are achieved by means of a matrix arrangement, for example in the form of a dither matrix or other matrix. Matrices of this type, however, have an unfavorable relation of resolution and gray gradation and run the risk of forming matrix contours and Moiré fringes, which limit the achievable printing quality.

Although it is known from U.S. Pat. No. 4,809,021 to achieve an increase of printing quality by generating points of varied size by means of variation of the intensity or the diameter of the laser beam, the shape of the points is, however, predetermined. As a result of this predetermined shape of the matrix points, in conjunction with the predetermined point size, it has not been possible until now, using electrophotographic printing equipment, to achieve offset-like printing quality both with respect to the representation of half-tones and also with respect to the representation of characters and printed lines.

SUMMARY OF THE INVENTION

It is therefore an object of the invention, for electrophotographic printing equipment, to provide a process and an arrangement which enables a high printing quality, both with respect to a representation of half-tones and with respect to characters and printed lines.

It is a further aim of the invention to design the process and the arrangement such that a finely graded offset-like matrix print is possible.

These and other objects and advantages of the invention are achieved by an electrophotographic process for generating a macro-charge zone which is inkable by toner applicators and is delimited by an inking limit having an adjustable contour on a photoconductor of a printing or copying machine, using at least one exposure-variable and position-variable controllable light source, the process having the following features:

a) for forming the macro-charge zone delimited by the inking limit, by controlling the exposure of the light source and the radiation position on the photoconductor and by controlling a bias voltage which can be applied between photoconductor and toner applicator, an electrostatic potential relief made of individual adjacent micro-charge zones of exposure-dependent size is generated on the photoconductor, and the inking limit is defined, the contour of which is determined by the bias voltage level on the potential relief;

b) the light emitted by the light source per micro-charge zone onto the photoconductor has an exposure distribution which is dimensioned in such a manner that, proceeding from a center of high exposure, the exposure falls off homogeneously to the outside.

The electrophotographic process is further defined wherein, to represent an area of a half-tone image, a matrix of macro-pixels having inking areas assigned to gray steps is used, the magnitude of which areas lies in the integration range of the human eye and each macro-pixel is in turn constructed from a matrix of micro-pixels and wherein a macro-charge zone, which is delimited by the inking limit, is generated on the photoconductor for each macro-pixel, using this inking area, the macro-charge zone being composed of adjacent micro-charge zones assigned to the micro-pixels. The micro-charge zones used for the formation of a macro-charge zone are generated on the photoconductor by means of light sources whose exposure distribution curves overlap on the photoconductor. The light sources have a cone-shaped and/or bell-shaped exposure distribution curve.

The electrophotographic process preferably provides a dimensioning of the overlapping of the exposure curves of the light sources for which it is true that:

a) Minimum overlapping: $f_u$ greater than 1 b) Maximum overlapping: $f_u = 4$ to 10 where the overlap factor $f_u$ is defined as the ratio of the diameter d of the spot of light at 12.5% of the maximum energy density of the spot of light to the matrix dimension dr $$f_u = \frac{d}{dr}$$

with a matrix dimension dr corresponding to the separation of the centers of two neighboring spots of light which are associated with the light sources.

the following process steps stabilize the potential relief:

a) adjusting the photoconductor to a predetermined potential value;

b) exposing the photoconductor with a predeterminable standard exposure pattern;

c) detecting an actual charge potential caused by the standard exposure pattern;

d) comparing the actual charge potential with a desired charge potential;

e) adjusting of the exposure level of the light sources causing the standard exposure pattern as a function of the comparison of desired and actual values in such a manner that, given exposure with the predetermined standard exposure pattern, the desired charge potential occurs on the photoconductor.

The following process steps control the inking of the potential relief:

a] generating a toner mark on the photoconductor, using a standard exposure pattern and detection of its actual optical density;

b) comparing the actual optical density with a desired density;

c) adjusting parameters of the developer process such as toner concentration and bias potential as a function of the comparison of desired and actual values and control of the parameters in such a manner that the desired optical density occurs. Preferably, the same exposure and measuring areas are used for the stabilization of the potential relief and the inking control.

An arrangement is provided for generating a macro-charge zone inkable by toner applicators and delimited by an inking limit having an adjustable contour on a photoconductor of a printing or copying machine, the macro-charge zone being constructed from neighboring micro-charge zones, the arrangement having:

at least one light source, which can be controlled in terms of its exposure and its radiation position on the photoconductor and has an exposure distribution which is dimensioned in such a manner that, proceeding from a center of high exposure, it falls off homogeneously to the outside;

equipment in order, as a function of data signals characterizing the magnitude and the location of the macro-charge zone on the photoconductor, to construct an electrostatic potential relief on the photoconductor by generating adjacent micro-charge zones of variable size, and to define the inking limit, the contour of which is determined by a bias voltage level on the potential relief, wherein the equipment has:

light source control means, coupled to the light sources, for controlling the exposure;

bias voltage control means in order to apply a bias voltage of adjustable magnitude between the toner applicators and the photoconductor; and means for defining the inking limit by means of data signal-dependent driving of the light source control means and/or the bias voltage control means. An optical comb with a multiplicity of individually drivable light sources is arranged as the light source. Alternately, a laser beam can be positioned via deflection equipment as the light source A control arrangement stabilizes the potential relief, wherein the control arrangement has:

a potential sensor to detect the level of a predeterminable photoconductor charge potential and an actual charge potential generated on the photoconductor by means of exposing the photoconductor adjusted to the predeterminable potential value, using a standard exposure pattern;

control equipment, coupled to the potential sensor and the light source control means, which sets the predetermined photoconductor charge potential as a function of a comparison of desired and actual values of the charge potentials and/or controls the exposure level of the light sources in such a manner that a desired charge potential occurs on the photoconductor during exposure with the standard exposure pattern. The equipment controlling the inking of the potential relief has:

means for detecting the optical density of a toner mark generated on the photoconductor using a standard exposure pattern;

an inking control equipment, which is coupled to the detection means and the units of a developer station which influence the development process and which, as a function of a comparison of desired and actual values of the optical density of the toner mark, controls parameters of the development process such as toner concentration and bias voltage in such a manner that the desired optical density occurs.

The arrangement may also include:

switching elements assigned to the light sources and actuating the light sources;

a clock-controlled counting equipment which can be coupled to the switching elements;

a memory, which can be coupled to the counting equipment, for receiving data words characterizing the exposure of each light source, and a control equipment which, for driving the light sources, presets counter states of the counting equipment in accordance with the data words stored in the memory and then, by clocking the counting equipment, activates the light sources via the switching elements in accordance with the counter states. Voltage-controlled current sources are provided which are assigned to the light sources and which set the exposure level of the light sources as a function of an excitation current caused by the current sources. The arrangement may also have:

a further memory equipment, which can be coupled to the memory, for receiving data words assigned to light source equalizing information, and a voltage-generating equipment which can be coupled to the voltage-controlled current sources and the further memory equipment and which generates drive voltages for the current sources as a function of the data words.

Advantageous embodiments of the invention are characterized in the subclaims.

For the gray-value representation of a half-tone image, the area of a half-tone image is subdivided into macro-pixels, the size of which lies in the integration range of the human eye. Each macro-pixel is, in turn, divided into micro-pixels. The character areas are likewise divided into micro-pixels, each character being implemented by means of a specific micro-pixel set. To generate the characters with the aid of an electrophotographic printing equipment, the photoconductor of the printing equipment is charged up uniformly and subsequently exposed with a pixel structure, which is developed by toner deposition.

A macro-pixel inking which can be graduated in a quasi-continuous manner is achieved by exposing the micro-pixels by means of an exposure device which permits a gradation of several lightness or exposure values per micro-pixel, for example an LED (light-emitting diode) character generator with a variable light energy emission per micro-pixel or by means of a laser beam that is controlled as a function of intensity. The exposure of the micro-pixels is controlled in such a manner that there is produced, for each macro-pixel, a potential trough, which leads to defined inking in the subsequent development. In the development of the exposed photoconductor locations which are predominantly used in electrophotographic printers those area proportions of the potential trough structure whose potential value lies below the bias potential of the developer station are inked in, the bias potential determining the inking limit. In this arrangement, the process is suitable both for reverse development and for direct development.

The integral gray value of a scanned area is determined by the half-tone value, which corresponds to the ratio of the area covered with toner to the toner-free area in the macro-pixel. The shape of these area proportions also has an influence on the impression of the gray area in the human eye. By means of the distribution of the micro-pixel exposure in the macro-pixel, the screen point shape that is customary in offset printing can also be approximated. Hence, on the one hand, an optimized relation of resolution and gray value gradation and, on the other hand, also an adaptation to what the eye is accustomed to seeing can be achieved.

In a similar way to the formation of the matrix contours, the contour of the characters and lines is formed by means of the construction of a potential trough structure or of a potential relief and its plane of intersection with the bias potential level of the developer station.

In the shaping of the half-tone matrices, the characters and curved and oblique lines and in the case of graphics, the potential trough structure can be adapted to the special reproduction properties of the actually used electrophotographic process in such a manner that its weaknesses can be compensated in a targeted manner. These include all density distortions caused by neighbor and edge effects, such as the non-uniform inking of lines parallel or transverse to the development direction and fine and wide lines and large areas.

By means of an asymmetric exposure energy distribution of the micro-pixels in the macro-pixel, the X-Y asymmetries, which are produced in the exposure distribution of the micro-pixels in the case of high printing speeds can be compensated by the firmware. Thus, a uniform macro-pixel symmetry can be achieved at different printing speeds in the case of the same light source emission area shape, for example from LEDs in the case of using an LED comb.

The reproducibility of the matrix gray values and of the character and line contours is achieved by means of the use of photoconductors and developers of a high characteristic curve stability in conjunction with a matrix characteristic curve control. The total gradation of the electrophotographic process is dimensioned sufficiently steeply, analogous to the gradation of reprographic materials.

The matrix characteristic curve control, which in particular guarantees the reproducibility of the printing matrix used and hence the printing quality, preferably comprises two control components, the first control component stabilizing the electrostatic potential relief and the second control component ensuring the constancy of the inking characteristic curve on the potential relief.

The invention enables a quasi-analog representation of half-tone images and lines of any shape. Here, only the size of the toner particles inking the charge zones sets a limit.

BRIEF DESCRIPTION OF THE DRAWINGS

Embodiments of the invention are shown in the drawings and are described in greater detail hereinafter by way of example. In the drawings:

FIG. 8 shows a schematic representation of an offset-like matrix shape which can be generated in macro-pixels, having a half-tone value of about 10%.

FIG. 9 shows a schematic representation of an offset-like matrix shape which can be generated in the same macro-pixels, having a half-tone value of 35%.

DETAILED DESCRIPTION OF THE PREFERRED EMBODIMENTS

Fundamental Considerations

Figure 1:
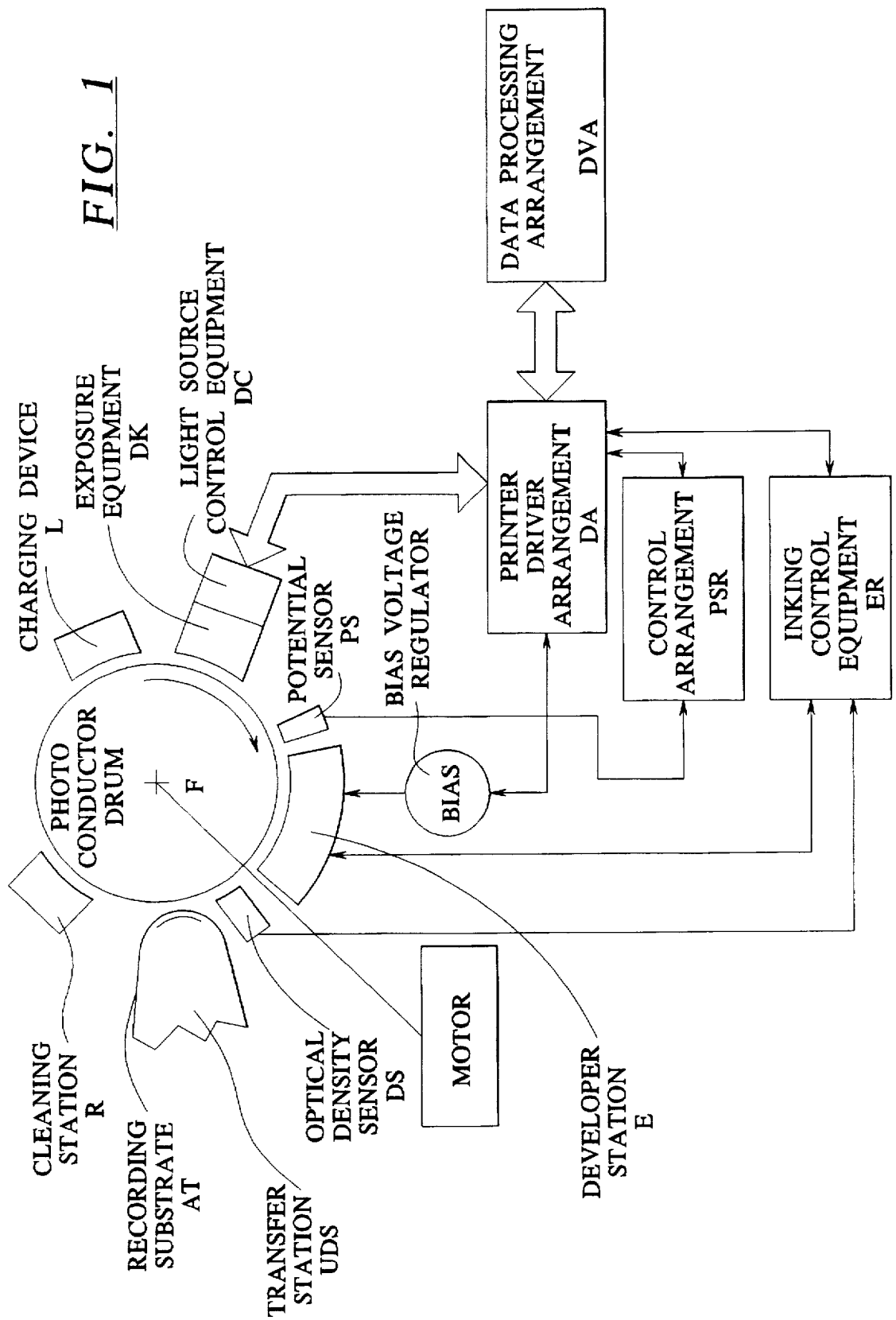
FIG. 1 shows a schematic representation of an electrophotographic printing equipment with an associated drive arrangement.

An electrophotographic printer, shown schematically in FIG. 1, contains a photoconductor drum F which can be driven by electric motor. Grouped around the photoconductor drum F are the units necessary for the electrophotographic process, such as exposure equipment DK, developer station E, transfer printing station UDS, cleaning station R and charging device L. In the electrophotographic process, the photoconductor drum F is charged up uniformly to about 500 V with the aid of the charging equipment L and then discharged, with the aid of the exposure equipment DK, into the region of about 70 V and a latent character image is thus generated. This latent character image thus generated is then inked in the normal fashion in the developer station E, with the aid of a two-component mixture of toner particles and ferromagnetic carrier particles. The toner particles are triboelectrically positively charged up. Between the developer roller, which is at a bias potential of 220 V, and the regions of the latent character image discharged to about 70 V, a field is produced, as a result of which the toner particles are taken up by the discharged regions. The toner particles are repelled by the non-exposed areas having a charge voltage of about 500 V. The toner image thus produced is then transferred in the usual fashion in the transfer printing station UDS onto a recording substrate AT and the photoconductor drum F is freed of adhering residual toner particles in the cleaning station R. Subsequently, the electrophotographic process begins again by means of charging up the photoconductor drum via the charging station L.

Any light source which can be variably driven in terms of its light energy emitted onto the photoconductor drum can be used as exposure equipment DK, for example a laser or, as in this case, an LED comb, as is described with reference to its geometric construction in European Patent Document EP-B1-0 275 254.

The light energy emitted by the exposure equipment is definitive for the discharge process on the photoconductor drum surface. Thus, in the case of the use of LEDs as a light source, it is possible to control the emitted light energy by varying the switch-on time or by means of the excitation current or by means of a combination of both.

LED character generators with individually drivable LEDs have an approximately cone-shaped radiation characteristic with respect to the individual LEDs. This is caused, on the one hand, by the approximately circularly configured LED structure, and on the other hand by focusing optics arranged between the LEDs and the photoconductor drum, which image the LED point of light in the form of a point on the photoconductor drum. As a result of this cone-shaped light intensity distribution over the luminous point, there results during the exposure of the photoconductor drum a corresponding cone-shaped discharge structure, which is designated in the following text as a potential trough. If a plurality of LEDs are involved in the formation of such a potential trough, there results a potential relief made of individual adjacent discharge zones. However, in this arrangement it is to be noted that this potential relief can also be generated using a single light source, if for example a specific zone of the photoconductor drum is successively exposed at different locations. The location of the exposure on the photoconductor drum is determined, on the one hand, by the instant of excitation in the case of a moving photoconductor drum and by the position of the individual LED on the LED comb. The same is true for a laser beam deflected via a deflection equipment.

Figure 2:
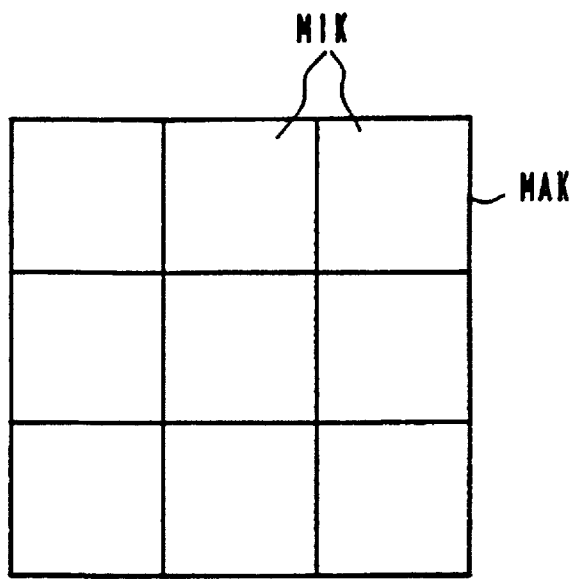
FIG. 2 shows a schematic representation of a macro-pixel made of nine micro-pixels.

Decisive for the degree of inking and the size of the area on the photoconductor which can be inked with toner is the form of the potential relief that is generated and the applied bias voltage, since this determines the inking limit on the potential relief. Thus, by means of controlling the light energy of the light source and the radiation position on the photoconductor, and by means of controlling the bias voltage which can be applied between photoconductor the and the toner applicator (developer station E), an electrostatic potential relief of light-energy-dependent size can be generated on the photoconductor and the inking limit defined, the contour of which is determined by the bias voltage level on the potential relief. This principle, on which the invention is based, is now to be explained in more detail:

To represent an area of a half-tone image, the area is divided into a matrix of macro-pixels MAK (FIG. 2), the size of which lies in the integration range of the human eye. Each macro-pixel MAK is in turn subdivided into micro-pixels MIK, so that in the example represented, the macro-pixel MAK consists of 3×3=9 micro-pixels. The character areas are also subdivided into micro-pixels, each character being implemented by means of a specific micro-pixel set. In the illustrated example of FIG. 2, the generation of the micro-pixels is carried out with the aid of a 600 dpi LED character generator having a micro-pixel size of about 40μ×40μ. From this, there results a macro-pixel size of 120μ×120μ, corresponding to 8.2 matrix points per millimeter in the edge direction. In this arrangement, a light source in the form of an LED is advantageously assigned to each micro-pixel. In general, to form a character the photoconductor F is uniformly charged up and subsequently exposed with a pixel structure, which is developed by means of toner deposition. To generate a macro-pixel inking which can be graduated in a quasi-continuous manner, the exposure of the micro-pixels MIK is carried out by means of the exposure device DK, which permits a gradation of several lightness or exposure values per micro-pixel, for example in the example shown, with the aid of an LED character generator having variable light energy emission per micro-pixel or with the aid of a laser beam which is controllable in terms of its intensity. The exposure of the micro-pixels in this arrangement is controlled in such a way that, for each macro-pixel, a potential trough is produced which leads in the subsequent development to a defined inking. In this case, those area components of the potential trough structure whose potential value lies below the bias potential of the developer station are inked.

The integral gray value of a scanned area is normally determined, by the half-tone value ϕ, which corresponds to the ratio of the area covered with toner to the toner-free area in the macro-pixel. The shape of these area components also has an influence on the impression of the gray area in the human eye.

By means of the distribution of the micro-pixel exposure in the macro-pixel, the matrix point shape that is customary in offset printing can be approximated, and thus, on the one hand, an optimized relation of resolution and gray value gradation and, on the other hand, an adaptation to what the eye is accustomed to seeing can be achieved. In a similar manner to the formation of the matrix contours, in this arrangement the contour of the characters and lines is formed by the construction of a potential trough structure and its plane of intersection with the bias potential level of the developer station.

Figure 3:
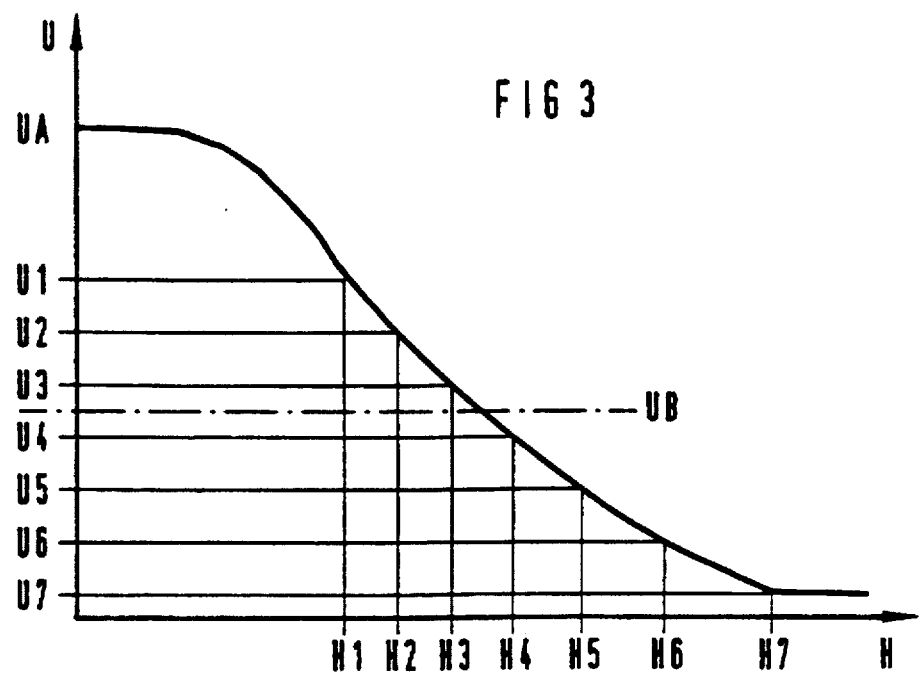
FIG. 3 shows a representation of the discharge potential on the photoconductor as a function of exposure in the case of a three-bit exposure gradation.

In order to generate these structures, the light sources of the exposure equipment DK must be able to be driven in multiple stages as regards the light energy they can emit. An eight-stage exposure gradation, which can be encoded via a three-bit data word, has proved to be sufficient. The relationship between the various exposure stages and the resulting potential value of a correspondingly exposed area is shown in FIG. 3. In this case, FIG. 3 shows the characteristic curve contour of a photoconductor drum having a specific photoconductor material. The values H1 to H7 designate the exposure, that is to say the light energy emitted by the light sources (LED) per area, for example in the dimensional unit (microjoule per $cm^2$), the values U1 to U7 the resulting potential level on the photoconductor F in volt after the exposure, starting from a charge potential UA, and UB the bias voltage level.

Figure 4:
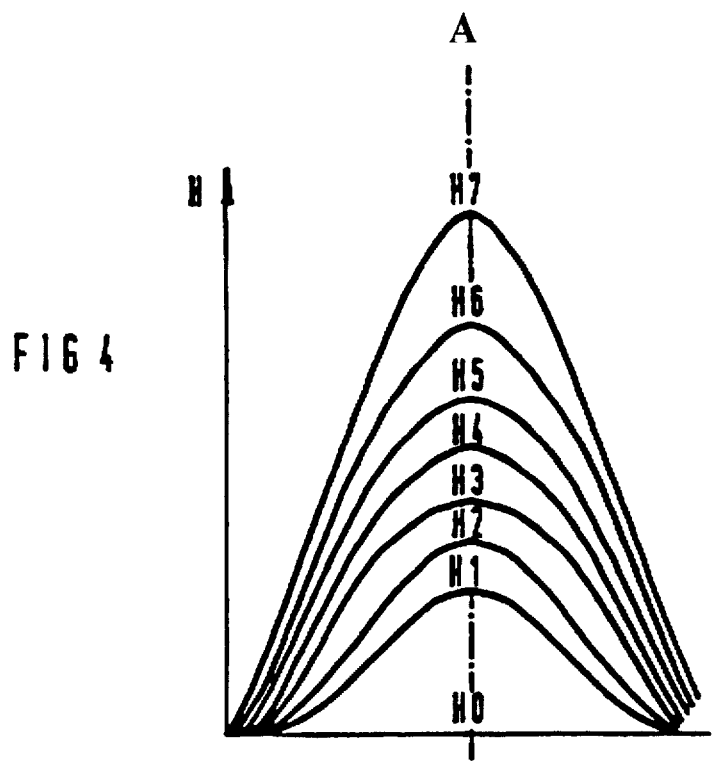
FIG. 4 shows a representation of the exposure profiles for one micro-pixel in the case of a three-bit exposure gradation and FIG. 5 a representation of the potential relief for a micro-pixel in the case of a three-bit exposure gradation.

As already explained at the beginning, LED light sources and laser beams have an approximately cone-shaped light intensity distribution. The curve contour, however, changes with the exposure stage and thus with the light energy. The intensity distribution along the distance X, and thus the exposure profile in the case of a 3-bit exposure gradation, in accordance with FIG. 3, is shown in FIG. 4.

Figure 5:
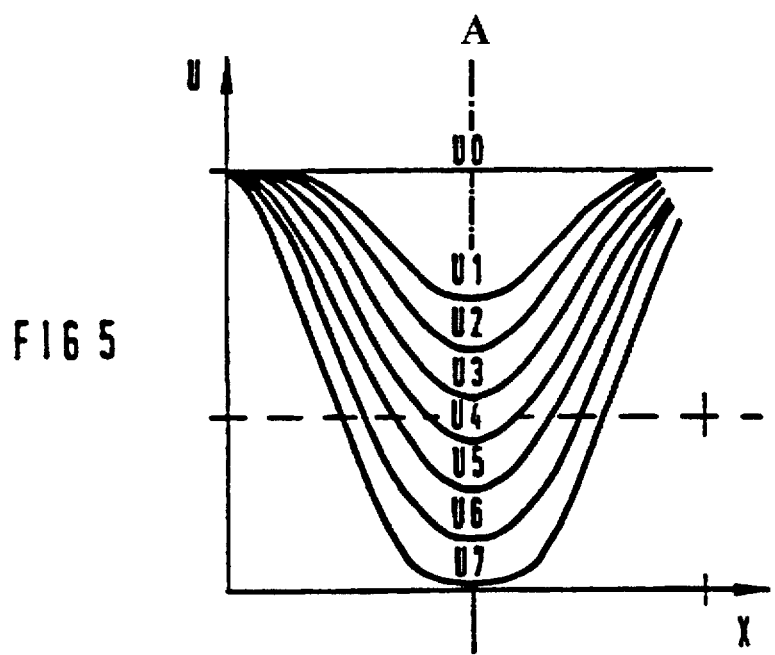

The eight-stage exposure with exposure profiles H0 to H7 leads to a potential relief structure corresponding to the representation of FIG. 5. The exposure with a micro-pixel having an intensity H1 thus leads to a potential trough U1 with a corresponding potential contour. In a corresponding fashion, the exposure stages H2 to H7 are assigned to the potential contours U2 to U7.

Figure 6:
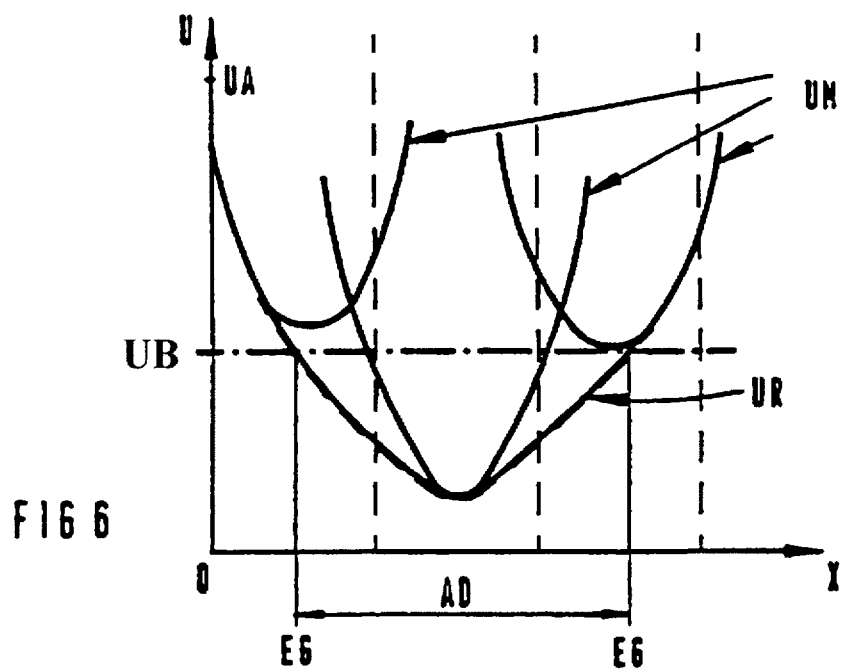
FIGS. 6 and 7 show a sectional representation of the generation of potential troughs by micro-pixels of variable exposure.
Figure 7:
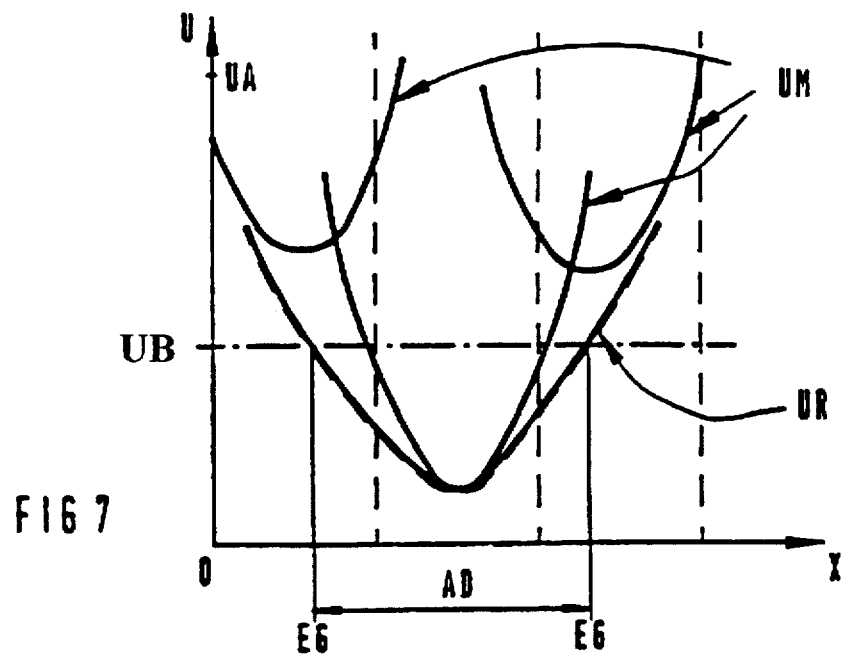

To generate a macro-pixel MAX of predetermined shape (FIG. 3), the exposure (exposure cone UM) of the micro-pixels MIK is controlled such that, in accordance with the FIGS. 6 and 7, there is generated for each macro-pixel MAK a resulting potential trough UR, which is inked with toner. The shape of the resulting potential trough UR in the macro-pixel MAX depends on the exposure distribution H and thus on the light energy of the micro-pixel exposure cone UM involved. The contour of the inking limit EG, that is to say the zone in which toner is taken up, is determined by the intersection line between the bias voltage UB and the resulting potential trough UR in the macro-pixel MAX. This means that the inking limit EG of the macro-charge zone UR is determined by the contour of the bias voltage level UB on the electrostatic potential relief UR made of individual neighboring micro-charge zones UM. In this case, AD designates the separation of two opposite points on the limiting line of the inked area.

As can be seen from FIGS. 6 and 7, the contour of the inking limit EG, and thus the contour of the inking structure generated in the macro-pixel MAK, can be defined by generating a resulting potential trough UR in the macro-pixel MAK over the micro-pixel exposure cone UM, the trough corresponding to the inking structure, at a predetermined charge potential UA and a predetermined bias potential UB. Likewise, in the case of a predetermined potential relief UR of the resulting potential trough in the macro-pixel, the bias voltage UB can be varied to define the inking limits EG. A combination of both processes is also possible.

In order that, via the adjacent micro-pixel exposure cone UM, a resulting potential trough UR can be generated in an optimum way, on the one hand a light intensity distribution (H over X) is necessary, which is dimensioned in such a way that, proceeding from a center A (FIG. 4) of high intensity, the intensity H falls off homogeneously to the outside (X, −X), on the other hand a sufficient overlap of the adjacent micro-pixel exposure cones UM is necessary. In this arrangement, the overlap factor $f_U$ can be used as a measure of the overlap, the factor being defined as the ratio of the pixel diameter d (diameter of the luminous point) at 12.5% of the maximum pixel energy density (energy density of the luminous point) to the basic matrix dimension dr. The basic matrix dimension in this case designates the separation of the centers of two pixels or luminous points $$f_u = \frac{d}{dr}$$

The minimum overlap is intended to lie at $f_u$ greater than 1. The upper limit of the overlap can lie at $f_u=4$ and above. The practical upper limit is dependent on the relation of the character generator resolution to the smallest dimension to be printed. For a character generator having a resolution of 600 dot/inch and a smallest point diameter to be printed of 0.1 mm, an overlap up to about $f_u=4$ is possible.

Figure 10:
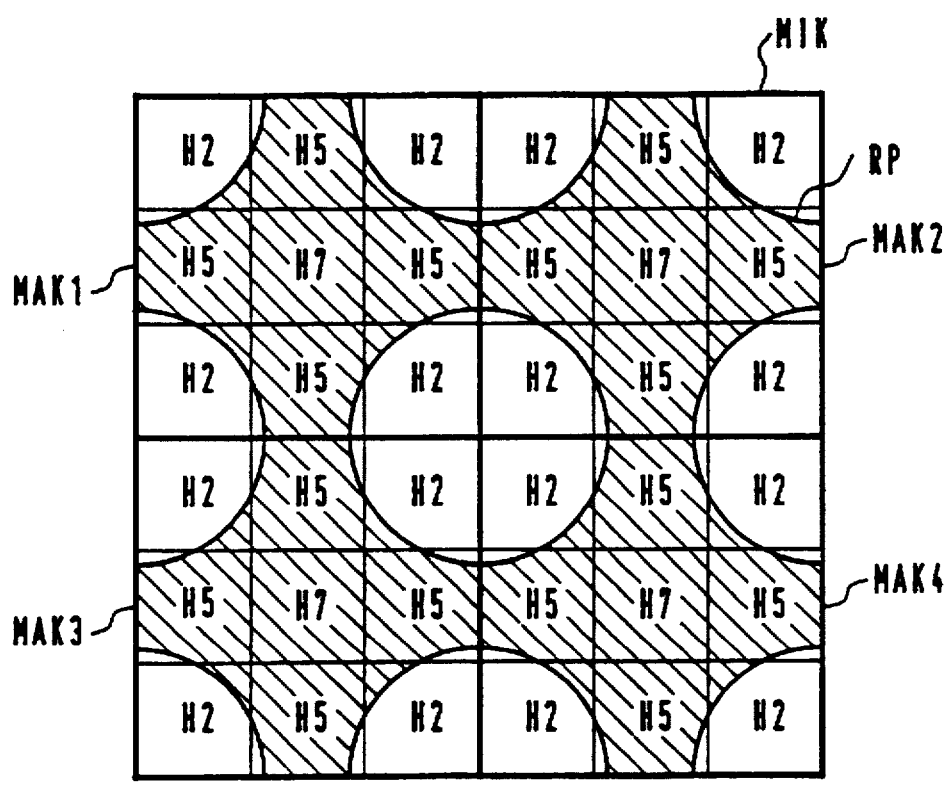
FIG. 10 shows a schematic representation of an offset-like matrix shape which can be generated in the same macro-pixels, having a half-tone value of 60%.
Figure 11:
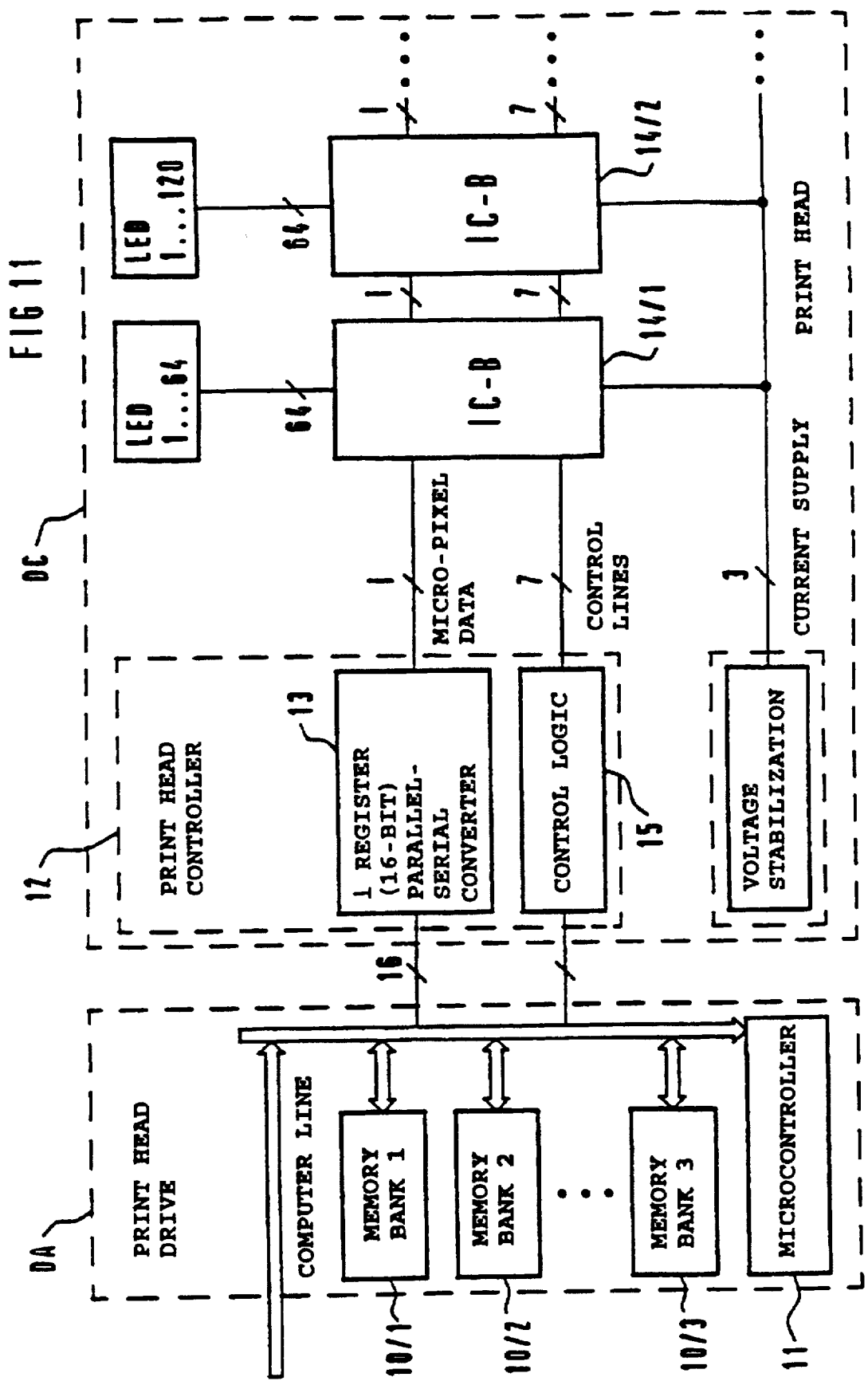
FIG. 11 shows a schematic block circuit diagram of a print head driver for an LED comb.

By varying the potential relief UR and the bias voltage UB, and thus by defining the inking limit EG, any desired inkable contour can be generated within the macro-pixel MAK. Thus, it is also possible, in accordance with the representations of FIGS. 8 to 10, to generate the matrix point shape that is customary in offset printing and thus, on the one hand, to achieve an optimized relation of resolution and gray value gradation and, on the other hand, an adaptation to what the eye is accustomed to seeing.

To generate a matrix area RP in macro-pixels MAK1 to MAK4 with different half-tone values φ, exposure cones UM having exposure stages corresponding to the exposure stages H0 to H7 are generated in the individual micro-pixel zones MIK within the macro-pixels MAK1 to MAK4 (FIG. 8). The bias voltage UB is predetermined in this case, with the result that the inking limit of the matrix areas RP and thus the inking area itself are determined by varying the exposure of the micro-pixels MIK. The light energies H0 to H7 assigned to the micro-pixels and corresponding to a 3-bit exposure gradation (FIGS. 3 to 5) are specified in FIGS. 8 to 10. Matrix area shapes RP having different half-tone values, such as are customary in offset printing, result therefrom. In this case, FIG. 8 represents a matrix point shape having a half-tone value φ of about 10%, FIG. 9 a matrix point shape or matrix area having a half-tone value of φ=35% and FIG. 10 a matrix point shape having a half-tone value of about φ=60%.

Exemplary Embodiment

An exemplary embodiment of the invention is described in more detail in the following, using FIGS. 1, 11 to 14.

The electrophotographic printing equipment already described in general at the start contains, as controllable light source DK, an LED character generator (print head) having a multiplicity of individually drivable LEDs, each LED being assigned a micro-pixel MIK. Coupled to the print head is a micro-processor-controlled control arrangement (FIG. 11), which essentially comprises a printer driver arrangement DA and a light source control equipment DC. The light source control equipment DC (FIG. 1) is integrated in the print head itself. A control arrangement PSR, stabilizing the potential relief, is connected to a potential sensor PS of normal constructional type assigned to the photoconductor F. The equipment ER controls the inking of the potential relief UR. The last-named control equipment ER is in turn connected to the developer station E and its elements, such as toner feed equipment, toner filling level sensor and an arrangement BIAS (for example a voltage regulator) controlling the bias voltage. The entire arrangement is driven via a data processing arrangement DVA arranged externally or internally in the printer. The DVA supplies information about the exposure H to be output for each luminous point (micro-pixel) and the radiation position on the photoconductor in the form of data signals, for example data words.

All the open-loop and closed-loop control arrangements can be designed in terms of hardware as separate μP-controlled arrangements or they can be a constituent part of a machine control system, which is otherwise constructed in the normal manner and controls the electrophotographic printing process, including recording substrate transport and fixing.

The data processing arrangement DVA supplies the information provided for the printing, in the form of data signals, via a parallel 16-bit interface, to the printer control arrangement DA. The exposure (light energy/area) for each luminous point (micro-pixel) is described in this arrangement by means of numeric values (exposure bytes). In this arrangement, the width of the exposure byte i determines the number of possible brightness stages. For example, for 8 exposure stages (H0 to H7), the exposure bytes comprise i=3 bits.

The exposure bytes are temporarily stored in i memory banks 10-1 to 10-3 in the printer drive arrangement DA, which is designed as a specific printed circuit board. For each bit of the exposure bytes, there exists a memory bank 10-1 to 10-3. To drive the print head, 16-bit words are transmitted one after another, by a microcontroller 11 arranged in the print head drive arrangement, from the i memory banks 10-1 to 10-3 to the electronics of a print head controller 12 arranged in the light source control equipment DC, and are buffered there in a 16-bit register of a parallel-serial converter 13. The parallel-serial converter 13 converts the i 16-bit words into 64 exposure bytes of width i, which are then transferred one after another to IC-B circuits 14/1 to 14/n.

Each IC-B circuit 14/2 to 14/n-1 is connected to its neighbor IC-B circuit 14/1 to 14/n, a group of LEDs having an equal number of LEDs being assigned in each case to each IC-B. These individual LED groups LED1 to LED64 and LED65 to LED128, respectively, and so on, in each case contain 64LEDs, which are in each case integrated together on one chip. At a printer resolution of 300 dots/inch for the printing of an A4 sheet transversely, about n=3500 LEDs are necessary in this case. By means of the coupling of the IC-Bs, a shift register of size n×i is produced, n representing the number of the LEDs to be driven and i the number of memory banks 10.

Figure 12:
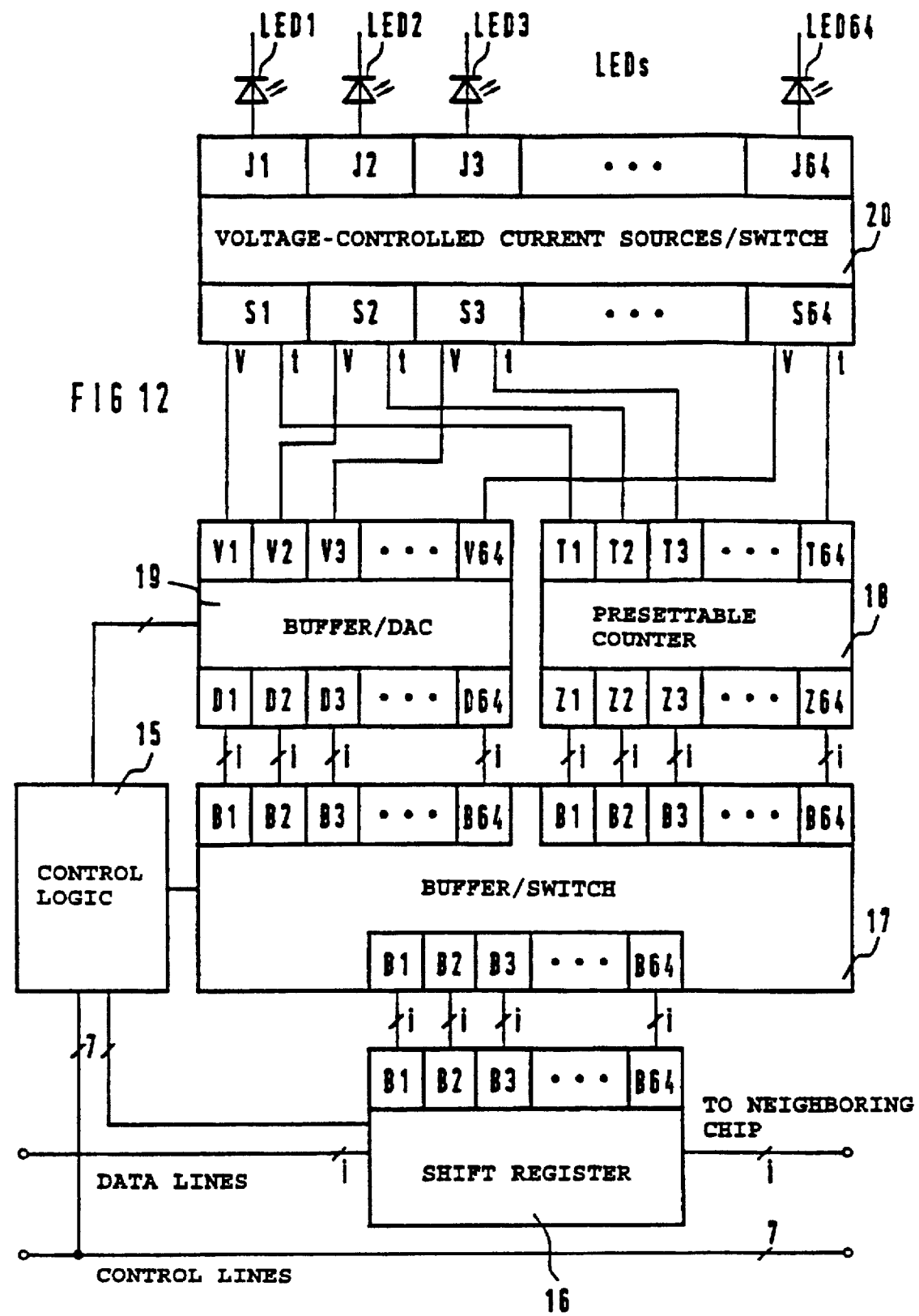
FIG. 12 shows a schematic representation of the construction of the IC-B (integrated circuit module) used in the print head driver of FIG. 11.

The construction of the IC-B circuits 14/1 to 14/n can be seen from FIG. 12. They are driven by a microprocessor-controlled control logic 15 of the print head controller 12 and contain in each case one shift register 16 having 64 memory locations, corresponding to the number of LEDs per LED group. In addition, 64 buffers with switching equipment 17; 64 presettable counters 18 and 64 digital-analog converters with associated buffers 19. For driving the 64 LEDs, voltage-controlled current sources with associated switching equipment 20 are provided.

The IC-B circuits operate in two phases, namely in an upload phase and in a printing phase. In the upload phase, the print head receives LED equalization information, which enables a virtually equal emission of light from all LEDs, the tolerance of the emitted light power being smaller than ±3%. This equalization information is likewise encoded as exposure bytes B1 to B64. It can be obtained via an exposure energy correction equipment as described in European Patent Document EP-B1-0 275 254. To provide this equalization, the equalization exposure bytes B1–Bn for all the LEDs are shifted into the shift register 16, one after another, by the print head controller 12. The control logic of each IC-B circuit 14/1 to 14/n subsequently effects, in conjunction with the IC-B switches is (upload/printing phase switchover), the transfer of the 64 bytes B1 to B64 to the buffer 17, which store the equalization values until the printer is switched off or until the upload phase is executed again. The buffers 17 control 64 individual digital-analog converters D1–D64 of the converter 19, which generate for each LED a specific potential V1 to V64, which determines the respective LED current and thus the level of the exposure.

For printing the micro-pixel lines, too, the exposure bytes B1 to B64 for all image points are first shifted into the IC-B shift registers 16. They are subsequently simultaneously transferred, in all the IC-B circuits 14/1 to 14/n, to in each case 64 pre-adjustable individual counters Z1–Z64 of width i of a counter block 18, the individual counters being assigned to the individual LEDs. The counters 18 are all clocked and counted downward together. The time between two clock pulses is determined by basic time clock, which is supplied via the control logic 15. Thus, as a function of the counter state, a switch-on time T1 to T64 is assigned to each of the voltage-controlled current sources 20 via their switches S1 to S64. In the case of a counter state not equal to zero, current flows in the LED. In the case of a zero counter state, it is switched off. The counting process determines, in the manner described, the emission duration of the LED1–LED64. The sizes of the individual LED currents I1 to I64 are fixed by means of the potentials V1 to V64 of the analog converter 19, which are preset in the upload phase.

The exposure distribution thus generated is imaged onto the photoconductor surface F via a Selfoc (self-focusing) optical system, not shown here.

The micro-pixel exposure distribution is made visible by means of the electrophotographic process in the following manner:

Firstly, the photoconductor F is charged up uniformly, the charge potential always being brought to a constant potential value UA (FIG. 3) with the aid of a customary potential control equipment.

Figure 13:
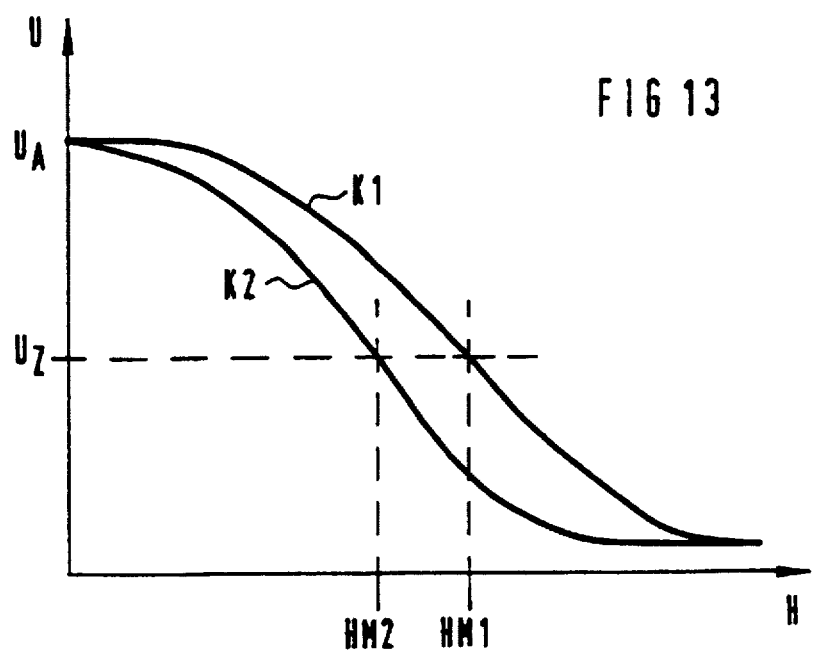
FIG. 13 shows a schematic representation of the exposure control by adaption of the average exposure to the current photoconductor characteristic curve and FIG. 14 shows a schematic four-quadrant representation of the inking control.

Exposure potential control by means of the control arrangement PSR is subsequently carried out. Here, at least one fixed exposure is applied to the photoconductor F, possibly also in the form of a matrix exposure, using the charge potential UA, and the integral potential value is measured by means of the potential probe PS. If a predeterminable target value UZ (FIG. 13) is not reached, a basic parameter of the LED print head, for example the drive current I or the switching time T, or both, is varied such that the average light emission is increased in the event that the measured potential value is larger than UZ. In the event that the measured potential value is smaller than UZ, the average light emission is reduced. Thus, by means of the exposure potential control, an adaptation of the exposure level to the photoconductor characteristic curve of the photoconductor used is carried out. This adaptation of the average exposure HM to the current photoconductor characteristic curve can be seen from FIG. 13. In this case, FIG. 13 shows the contour of two photoconductor characteristic curves for different temperatures, the photoconductor characteristic curve K2 being assigned to a temperature which is larger than the temperature of the photoconductor characteristic curve K1. In order to achieve the exposure target value UZ, for the characteristic curve K1 the exposure HM1 must be adjusted, and for the characteristic curve K2 the exposure HM2 must be adjusted.

For the exposure control, the time base value (basic time clock) or print head LED base current I can be used in an advantageous manner as the basic parameter of the LED print head to be varied. Using time base control, the switch-on time of the LEDs is varied proportionally. The base current determines the fundamental value of the LED light power or the exposure level. Both forms of control of the exposure have the advantage that both the displacement of the average sensitivity of the photoconductor F and the variation of the steepness of the photoconductor characteristic curves K1, K2 are thus taken account of.

By means of the above-described step, the base value of the exposure is aligned with the current characteristic curve shape of the photoconductor in such a way that the same potential values are always generated using specific exposure time values. Thus, for example, the temperature and the cycle influence on the photoconductor characteristic curve and the photoconductor charge fluctuations can be compensated on the side of the printed image.

After the base value of the exposure has been adjusted such that, in the predetermined tolerances, the same potential value—in the case of matrices the same potential relief—is produced in the case of a specific exposure time there follows the step of controlling the inking with the aid of the control arrangement ER.

Figure 14:
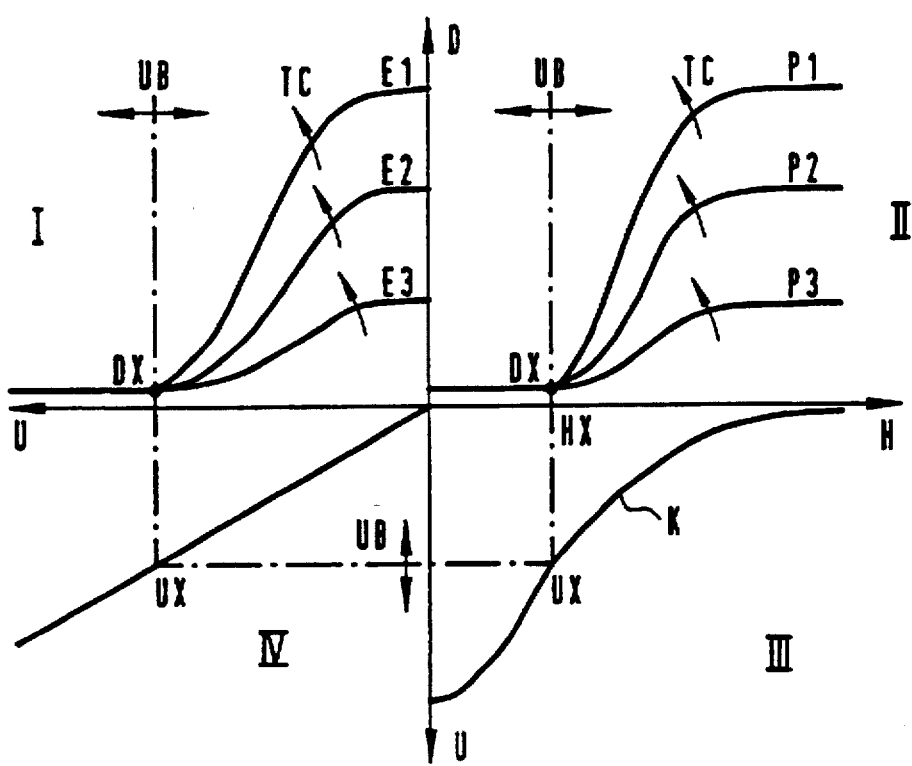

The inking control is explained in more detail using FIG. 14. The representation of FIG. 14 is a graphical four-quadrant representation, which is customary in electrophotography, of the electrophotographic processes. The quadrant I shows the contour of the development characteristic curves E1, E2 and E3 and thus the dependence of the optical density D on the photoconductor potential U for various degrees $\phi$ of inking, specifically for $\phi=100\%$, corresponding to the characteristic curve E1, $\phi=70\%$, corresponding to the characteristic curve E2 and $\phi=50\%$, corresponding to the characteristic curve E3. The quadrant II shows, in turn, the contour of the process characteristic curves P1 to P3 and thus the dependence of the optical density D on the exposure H at the corresponding degrees of inking of 100%, 70% and 50%. Shown in the quadrant III is the photoconductor characteristic curve K assigned to the photoconductor used, corresponding to the characteristic curve of FIG. 13, and thus the dependence of the exposure potential U as a function of the exposure H. The quadrant IV contains a mirror-image straight line featuring a change in scale for the purpose of graphically transferring the potential value U, which can be read off on the photoconductor discharge characteristic curve K, onto the development characteristic curves E1 to E3. The dash-dotted lines explain the possibilities for assignment within the characteristic curves. Thus, a discharge potential UX with an associated optical density DX on the development characteristic curves E corresponds to an exposure HX or, respectively, to a corresponding optical density DX on the process characteristic curve P. TC designates the variations of the development characteristic curves E and the process characteristic curves P as a function of the toner concentration. UB designates the bias potential.

For controlling the inking, a matrix area and, if required, additionally a full-tone area are exposed onto the photoconductor F and developed by means of toner depositions. The developed optical actual densities D are measured via an optical density sensor DS (FIG. 1) and compared with predeterminable exposure target values (optical densities, desired densities) for the matrix area and, if required, for the full-tone area. According to the magnitude of the deviation from the exposure target values (desired values), one or more basic variables of the development process are varied. As can be seen from FIG. 14, the steepness (gradation) of the development characteristic curves E and of the process characteristic curves P can be increased by increasing the toner concentration TC. By altering the bias potential UB, the development characteristic curves E or the process characteristic curves P can be displaced in parallel fashion along the abscissa (displacement of points DX). According to the requirement for correction, the target characteristic curve combination (matrix characteristic curve and, if required, full-tone characteristic curve) can be adjusted by altering the toner concentration TC and/or by altering the bias potential UB.

The exposure potential control and the inking control can be combined with each other in such a way that the same exposure and measuring areas are used for both control systems. Since the exposure potential values are measured first, a start can be made in the same cycle using the same inking control, in the event that the exposure potential values lie in the target range. After reaching the inking target values, it is possible to start the printing process. The maintenance of the target values for the charge potential UA, the exposure potential (exposure target value UZ), the optical density for matrix area and full-tone area DR is cyclically monitored during printing and re-adjusted if necessary. The monitoring and control process can be executed automatically, controlled by the machine control system.

As already explained at the beginning, in conjunction with FIGS. 6 and 7, by means of the character-dependent driving of the LEDs micro-pixel exposure cones UM having different micro-pixel exposure distributions are generated, causing a resulting potential trough UR or potential relief in the macro-pixel. The toner is deposited only on the areas of the macro-pixel whose exposure potential is smaller than the bias voltage UB. Hence, the intersection line AD of the bias level UB with the potential trough UR or the potential relief specifies the inking limit EG. This can be varied in fine steps, as emerges from the comparison of the representations of FIGS. 6 and 7, by means of step-wise variation of the exposure in the neighboring micro-pixels while the exposure of the central micro-pixel is kept constant. This gradation is "softer", the more the light energy distribution of adjacent micro-pixels overlaps geometrically, and the more exposure stages per micro-pixel can be adjusted in a defined manner.

In the case of the exemplary embodiment described, the photoconductor F is charged up before the exposure process with the aid of the charging equipment L, and is discharged via the exposure equipment DK. The same principle, however, can also be applied to electrophotographic processes in which the discharged photoconductor is charged up as a function of the character with the aid of the exposure equipment DK. Both an intensity-controlled laser beam and the LED comb described can be used for the exposure equipment DK. The use of other intensity-dependently controllable light sources, such as laser diodes and so on, is also possible.

It has been proved that, in the inking of the macro-charge zones, the toner deposition deviates from the exact electrostatic inking limit. These deviations are amplified by the toner transfer process to the final image substrate, which most often comprises paper, and by the fixing of the toner image. In some cases this makes necessary an empirical equalization of the exposure values and the inking characteristic curves, in order to achieve a predetermined target characteristic curve combination (density curves for full-tone areas, matrix areas and lines).

Although other modifications and changes may be suggested by those skilled in the art, it is the intention of the inventors to embody within the patent warranted hereon all changes and modifications as reasonably and properly come within the scope of their contribution to the art.

We claim:

1. An electrophotographic process for generating a macro-charge zone inkable by toner applicators and delimited by an inking limit having an adjustable contour on a photoconductor of a printing or copying machine, using at least one exposure-variable and position-variable controllable light source, comprising the steps of:

a) forming the macro-charge zone delimited by the inking limit, by controlling exposure of the light source and a radiation position on the photoconductor and by controlling a bias voltage which is applied between the photoconductor and the toner applicator, generating an electrostatic potential relief of the macro-charge zone made of individual adjacent micro-charge zones of exposure-dependent size on the photoconductor, and defining the inking limit, a contour of the inking limit being determined by a level of the bias voltage on the electrostatic potential relief of the macro-charge zone; and b) dimensioning the exposure distribution of light emitted by the light source per micro-charge zone onto the photoconductor in such a manner that, proceeding from a center of high exposure, the exposure H falls off homogeneously to an outside of the macro-charge zone.

2. An electrophotographic process as claimed in claim 1, further comprising the step of:

to represent an area of a half-tone image, using a matrix of macro-pixels having inking areas assigned to gray steps, a magnitude of the inking areas lies in integration range of the human eye, and constructing each macro-pixel from a matrix of micro-pixels, generating a macro-charge zone which is delimited by the inking limit on the photoconductor for each macro-pixel using the inking area, said macro-charge zone being composed of adjacent micro-charge zones assigned to the micro-pixels.

3. An electrophotographic process as claimed in claim 1, further comprising the step of:

generating the micro-charge zones used for the formation of a macro-charge zone on the photoconductor by light sources whose exposure distribution curves overlap on the photoconductor.

4. An electrophotographic process as claimed in claim 3, wherein the light sources have a cone-shaped exposure distribution curve.

5. An electrophotographic process as claimed in claim 3, further comprising the step of:

using light sources having a dimensioning of overlapping of the exposure curves for which it is true that:
   a) Minimum overlapping: $f_u$ greater than 1
   b) Maximum overlapping: $f_u$=4 to 10 where the overlap factor $f_u$ is defined as a ratio of diameter d of the spot of light at 12.5% of the maximum energy density of the spot of light to matrix dimension dr $$f_u = \frac{d}{dr}$$

with a matrix dimension dr corresponding to a separation of the centers of two neighboring spots of light which are associated with the light sources.

6. An electrophotographic process as claimed in claim 1, further comprising the step of:

stabilizing the potential relief including the substeps of:

a) adjusting the photoconductor to a predetermined potential values;

b) exposing the photoconductor with a predeterminable standard exposure pattern;

C) detecting an actual charge potential caused by the standard exposure pattern;

d) comparing the actual charge potential with a desired charge potential; and e) adjusting the exposure level of the light sources causing the standard exposure pattern as a function of the comparison of desired and actual values in such a manner that, given exposure with the predetermined standard exposure pattern, the desired charge potential occurs on the photoconductor.

7. An electrophotographic process as claimed in claim 1, further comprising the step of:

controlling the inking of the potential relief including the substeps of:

a) generating a toner mark on the photoconductor using a standard exposure pattern and detection of the toner mark's actual optical density;

b) comparing the actual optical density of the toner mark with a desired density;

c) adjusting parameters of the developer process as a function of the comparison of desired and actual values and control of the parameters in such a manner that the desired optical density occurs.

8. An electrophotographic process as claimed in claim 6, further comprising the step of:

controlling the inking of the potential relief including the substeps of:

a) generating a toner mark on the photoconductor using a standard exposure pattern and detection of the toner mark's actual optical density;

b) comparing the actual optical density of the toner mark with a desired density:

c) adjusting parameters of the developer process as a function of the comparison of desired and actual values and control of the parameters in such a manner that the desired optical density occurs;

wherein the same exposure and measuring areas are used for the step of stabilizing the potential relief and the step of controlling inking.

9. An arrangement for generating a macro-charge zone inkable by toner applicators and delimited by an inking limit having an adjustable contour on a photoconductor of a printing or copying machine, the macro-charge zone being constructed from neighboring micro-charge zones, comprising:

macro-charge zone which is controllable in terms of its exposure and its radiation position on the photoconductor, said at least one light source having an exposure distribution which is dimensioned in such a manner that, proceeding from a center of high exposure, it falls off homogeneously to the outside;

means for forming an electrostatic potential relief as a function of data signals characterizing a magnitude and location of the macro-charge zone on the photoconductor on the photoconductor by generating adjacent micro-charge zones of variable size, and for defining the inking limit, a contour the micro-charge zones being determined by a bias voltage level on the potential relief, wherein said means for forming an electrostatic potential relief includes:

light source control means, coupled to the light sources, for controlling exposure of said photoconductor;

bias voltage control means to apply a bias voltage of adjustable magnitude between the toner applicators and the photoconductor, and means for defining the inking limit including means for data signal-dependent driving of the light source control means.

10. An arrangement as claimed in claim 9, wherein said at least one light source comprises an optical comb with a multiplicity of individually drivable light sources.

11. An arrangement as claimed in claim 9, wherein said at least one light source comprises a laser beam which is positionable via deflection equipment.

12. An arrangement as claimed in claim 9, further comprising:

a control arrangement means for stabilizing the potential relief comprising:

a potential sensor operable to detect a level of a predeterminable photoconductor charge potential and an actual charge potential generated on the photoconductor, said potential sensor exposing the photoconductor adjusted to the predeterminable potential value using a standard exposure pattern;

control equipment coupled to the potential sensor and the light source control means, said control equipment being operable to set the predetermined photoconductor charge potential as a function of a comparison of desired and actual values of the charge potentials.

13. An arrangement as claimed in claim 9, further comprising:

means for controlling the inking of the potential relief comprising:

means for detecting optical density of a toner mark generated on the photoconductor using a standard exposure pattern;

an inking control equipment which is coupled to the detection means and units of a developer station which influence a development process and which, as a function of a comparison of desired and actual values of the optical density of the toner mark, controls parameters of the development process in such a manner that the desired optical density occurs.

14. The arrangement as claimed in claim 9, further comprising:

switching elements assigned to said at least one light source and operable to actuate said at least one light source;

a clock-controlled counting equipment coupled to the switching elements;

a memory coupled to the counting equipment for receiving data words characterizing the exposure of each light source; and a control equipment which, for driving the at least one light source, presets counter states of the counting equipment in accordance with data words stored in the memory and then, by clocking the counting equipment, activates the at least one light source via the switching elements in accordance with the counter states.

15. An arrangement as claimed in claim 9, further comprising:

voltage-controlled current sources assigned to the at least one light source and which set the exposure level of the at least one light source as a function of an excitation current caused by the current sources.

16. An arrangement as claimed in claim 14, further comprising:
- a further memory equipment coupled to the memory for receiving data words assigned to light source equalizing information; and
- a voltage-generating equipment coupled to the voltage-controlled current sources and the further memory equipment and which generates drive voltages for the current sources as a function of the data words.

17. An electrophotographic process as claimed in claim 3, wherein the light sources have a bell-shaped exposure distribution curve.

18. An electrophotographic process as claimed in claim 7, wherein the step of adjusting parameters of the developer process adjusts toner concentration and bias potential.

19. An arrangement for generating a macro-charge zone inkable by toner applicators and delimited by an inking limit having an adjustable contour on a photoconductor of a printing or copying machine, the macro-charge zone being constructed from neighboring micro-charge zones, comprising:
- macro-charge zone and means for controlling said macro-charge zone in terms of its exposure and its radiation position on the photoconductor, said at least one light source having an exposure distribution which is dimensioned in such a manner that, proceeding from a center of high exposure, it falls off homogeneously to the outside;
- means for constructing an electrostatic potential relief as a function of data signals characterizing a magnitude and location of the macro-charge zone on the photoconductor by generating adjacent micro-charge zones of variable size, and for defining the inking limit, a contour the micro-charge zones being determined by a bias voltage level on the potential relief, wherein said means for constructing an electrostatic potential relief includes:
- light source control means, coupled to the light sources, for controlling exposure of said photoconductor;
- bias voltage control means to apply a bias voltage of adjustable magnitude between the toner applicators and the photoconductor, and
- means for defining the inking limit including means for data signal-dependent driving of the bias voltage control means.

20. An arrangement as claimed in claim 9, further comprising:
- a control arrangement means for stabilizing the potential relief comprising:
  - a potential sensor operable to detect a level of a predeterminable photoconductor charge potential and an actual charge potential generated on the photoconductor, said potential sensor exposing the photoconductor adjusted to the predeterminable potential value using a standard exposure pattern;
  - control equipment coupled to the potential sensor and the light source control means, said control equipment being operable to control the exposure level of the light sources in such a manner that a desired charge potential occurs on the photoconductor during exposure with the standard exposure pattern.

21. An arrangement as claimed in claim 13, wherein said inking control equipment controls toner concentration and bias voltage.

* * * * *